US009377309B2

(12) United States Patent
Hickey et al.

(10) Patent No.: US 9,377,309 B2
(45) Date of Patent: Jun. 28, 2016

(54) GLOBAL POSITIONING SYSTEM (GPS) SELF-CALIBRATING LEVER ARM FUNCTION

(71) Applicant: Honeywell International Inc., Morristown, NJ (US)

(72) Inventors: Mark Hickey, New Hope, MN (US); Kevin D. Vanderwerf, Oro Valley, AZ (US); Mark A. Ahlbrecht, Champlin, MN (US)

(73) Assignee: Honeywell International Inc., Morris Plains, NJ (US)

( * ) Notice: Subject to any disclaimer, the term of this patent is extended or adjusted under 35 U.S.C. 154(b) by 143 days.

(21) Appl. No.: 14/230,738

(22) Filed: Mar. 31, 2014

(65) Prior Publication Data

US 2015/0276413 A1 Oct. 1, 2015

(51) Int. Cl.
*G01C 21/16* (2006.01)
*G01S 19/23* (2010.01)

(52) U.S. Cl.
CPC ............... *G01C 21/165* (2013.01); *G01S 19/23* (2013.01)

(58) Field of Classification Search
None
See application file for complete search history.

(56) References Cited

U.S. PATENT DOCUMENTS

| 5,784,029 A | 7/1998 | Geier | |
| 5,999,880 A * | 12/1999 | Okada | G01S 19/51 342/357.64 |
| 6,401,036 B1 * | 6/2002 | Geier | G01S 19/49 180/167 |
| 8,232,876 B2 * | 7/2012 | Derrick | G01S 5/0027 340/539.1 |
| 8,416,129 B2 | 4/2013 | Martens et al. | |
| 2005/0256637 A1 | 11/2005 | Tazartes et al. | |
| 2010/0066603 A1 | 3/2010 | O'Keefe et al. | |
| 2013/0135143 A1 | 5/2013 | Martens et al. | |

FOREIGN PATENT DOCUMENTS

EP 0838691 4/1998

OTHER PUBLICATIONS

European Patent Office, "Extended European Search Report from EP Application No. 15159975.0 mailed Jul. 31, 2015", "from Foreign Counterpart of U.S. Appl. No. 14/230,738", filed Jul. 31, 2015, pp. 1-7, Published in: EP.
Seo et al., "Lever Arm Compensation for GPS/INS/Odometer Integrated System", "International Journal of Control, Automation, and Systems", Apr. 2006, pp. 247-254, vol. 4, No. 2.
Bender et al., "A Graph Based Bundle Adjustment for INS-Camera Calibration", "International Archives of the Photogrammetry, Remote Sensing and Spatial Information Sciences", Sep. 4-6, 2013, pp. 39-44, vol. XL-1/W2, Published in: Rostock, DE.

* cited by examiner

*Primary Examiner* — John R Olszewski
*Assistant Examiner* — Nicholas K Wiltey
(74) *Attorney, Agent, or Firm* — Fogg & Powers LLC (57) ABSTRACT

A method to calibrate at least one lever arm between at least one respective global positioning system (GPS) antenna/receiver and a communicatively coupled inertial navigation system is provided. The method includes receiving signals from the at least one GPS antenna/receiver at the inertial navigation system communicatively coupled to a Kalman filter; and estimating, in the Kalman filter, at least one fixed lever arm component while accounting for a bending motion of the lever arm based on the received signals.

20 Claims, 3 Drawing Sheets

GLOBAL POSITIONING SYSTEM (GPS) SELF-CALIBRATING LEVER ARM FUNCTION

BACKGROUND

To get the maximum benefit from an Inertial Navigation System (INS), the INS needs to know the distance between the INS center of percussion and a global positioning system (GPS) antenna (receiver). This distance is referred to as the lever arm. The lever arm can be a difficult thing to measure depending on the distance and location of the equipment. For example, installations can exist with lever arms over 100 meters with multiple immovable objects between the INS and GPS. Any error in this measurement will affect the overall performance of the INS and the ability of the INS to screen bad measurements from the GPS, which can affect the integrity of the system.

SUMMARY

The present application relates to a method to method to calibrate at least one lever arm between at least one respective global positioning system (GPS) antenna/receiver and a communicatively coupled inertial navigation system. The method includes receiving signals from the at least one GPS antenna/receiver at the inertial navigation system communicatively coupled to a Kalman filter; and estimating, in the Kalman filter, at least one fixed lever arm component while accounting for a bending motion of the lever arm based on the received signals.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 1:
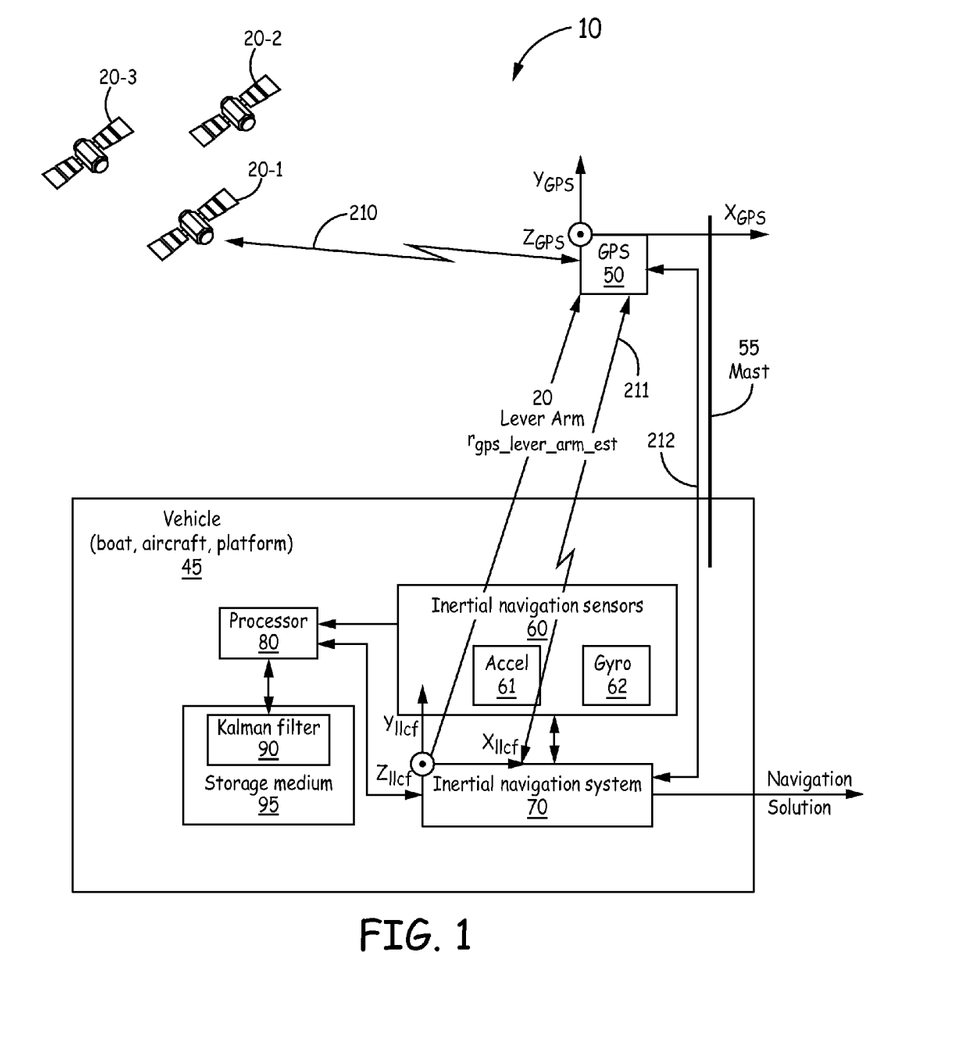
FIG. 1 is a block diagram of an embodiment of a system to calibrate a single lever arm in real-time.

FIG. 1 is block diagram of an embodiment of a system 10 to calibrate a single lever arm 20 in real-time. The system 10 includes the software, hardware, and/or firmware required for a GPS self-calibrating lever arm function. The system 10 is positioned on a vehicle 45. The system 10 includes an inertial navigation system 70, a processor 80, a Kalman filter 90 in a storage medium 95, inertial navigation sensors 60, and a global positioning system antenna/receiver (GPS) 50. The vehicle 45 can be a water-based vehicle, an aircraft, or a land-based vehicle. A lever arm 20 is the distance between the GPS antenna/receiver 50 and the inertial navigation system 70. As defined herein, the calibration is a real-time calibration in that the calibration occurs after the system 10 is installed on the vehicle 45 and during the first movements of the vehicle 45 after the installation of the system 10. For example, if the vehicle 45 is a boat, the real-time calibration occurs as the boat leaves the port in which it was positioned when the system 10 was installed. For another example, if the vehicle 45 is an aircraft, the real-time calibration occurs as the aircraft moves on the tarmac out of the hanger in which the aircraft was positioned when the system 10 was installed.

The inertial navigation sensors 60 provide information indicative of inertial measurements to the processor 80. The inertial measurements include one or more of position, orientation, velocity, and acceleration of the inertial navigation system 70. The inertial navigation sensors 60 include at least one accelerometer 61 and at least one gyroscope 62. The inertial navigation system 70 is co-located with the inertial navigation sensors 60 on the vehicle 45.

The GPS antenna/receiver 50 is shown on a mast 55 and is offset from the inertial navigation system 70 by the lever arm 20, which is also represented as $r_{gps\_lever\_arm\_est}$. The inertial navigation system 70 is positioned in a local level computational frame (llcf) at a first position ($x_{llcf}$, $y_{llcf}$, $z_{llcf}$) on the vehicle 45. The first position ($x_{llcf}$, $y_{llcf}$, $z_{llcf}$) is the INS center of percussion. The GPS antenna/receiver 50 is positioned at a second position ($x_{GPS}$, $y_{GPS}$, $z_{GPS}$) on the vehicle 45. The lever arm 20 is the difference between the first position ($x_{llcf}$, $y_{llcf}$, $z_{llcf}$) of the inertial navigation system 70 and the second position ($x_{GPS}$, $y_{GPS}$, $z_{GPS}$) of the GPS antenna/receiver 50. In one implementation of this embodiment, the distance between the first position ($x_{llcf}$, $y_{llcf}$, $z_{llcf}$) of the inertial navigation system 70 and the second position ($x_{GPS}$, $y_{GPS}$, $z_{GPS}$) of the GPS antenna/receiver 50 is over 100 meters.

As shown in FIG. 1, the GPS antenna/receiver 50 is communicatively coupled via wireless communication link 210 to satellite 20-1. In one implementation of this embodiment, the GPS antenna/receiver 50 is also communicatively coupled to one or more other satellites represented generally at 20-2 and 20-3 via wireless communication links that are not shown.

The inertial navigation system 70 is communicatively coupled to the GPS antenna/receiver 50 via a communication link 211 and/or 212. The communication link 211 is a wireless communication link 211. The communication link 212 is a hardwired communication link 212. The processor 80 is communicatively coupled to the inertial navigation sensors 60, the inertial navigation system 70, and the Kalman filter 90. The Kalman filter 90 is executable by the processor 80 to provide an accurate lever arm.

The Kalman filter 90 is configured to provide a real-time, accurate calibration of lever arm 20 between the GPS antenna/receiver 50 and the inertial navigation system 70 when the inertial navigation system 70 is placed on the vehicle 45 with the GPS antenna/receiver 50. The calibration process described herein accounts for any bending of the lever arm 20 that occurs as the calibration described herein is being implemented. When the calibration process is completed, the inertial navigation system 70 outputs an accurate navigation solution based on the highly accurate lever arm estimated during the calibration process described herein.

In order to provide real-time calibration of the lever arm 20, the Kalman filter 90 is configured to estimate at least one fixed lever arm component while accounting for a bending motion of the lever arm based on the received signals received from the GPS antenna/receiver. The bending motion of the lever arm causes the lever arm to have both a fixed lever arm component and a bent lever arm component. The fixed lever arm component is referred to herein as a "fixed lever arm" and the bent lever arm component is referred to herein as a "bent lever arm".

In one implementation of this embodiment, the Kalman filter 90 estimates at least one fixed lever arm component while accounting for a bending motion of the lever arm by: implementing an expanded state transition matrix including at least one expanded state-matrix diagonal element $\Phi_{la,la}$ associated with at least one fixed lever arm and associated with at least one bent lever arm; implementing an expanded noise covariance matrix including at least one expanded noise-matrix diagonal element $Q_{la,la}$ associated with the at least one fixed lever arm and associated with the at least one bent lever arm; and estimating a single lever arm 20 (represented generally as $r_{gps\_lever\_arm\text{-}est}$ in the equations shown below) in real-time based on the implementing of the expanded state transition matrix and the expanded noise covariance matrix. The expanded state-matrix diagonal element associated with the fixed lever arm and associated with the bent lever arm is a 6-by-6 expanded state sub-matrix represented generally at $\Phi_{la1,la1}$, which is described below. The expanded noise-matrix diagonal element associated with the fixed lever arm and associated with the bent lever arm is a 6-by-6 expanded noise sub-matrix $Q_{la1,la1}$, which described below.

Figure 2:
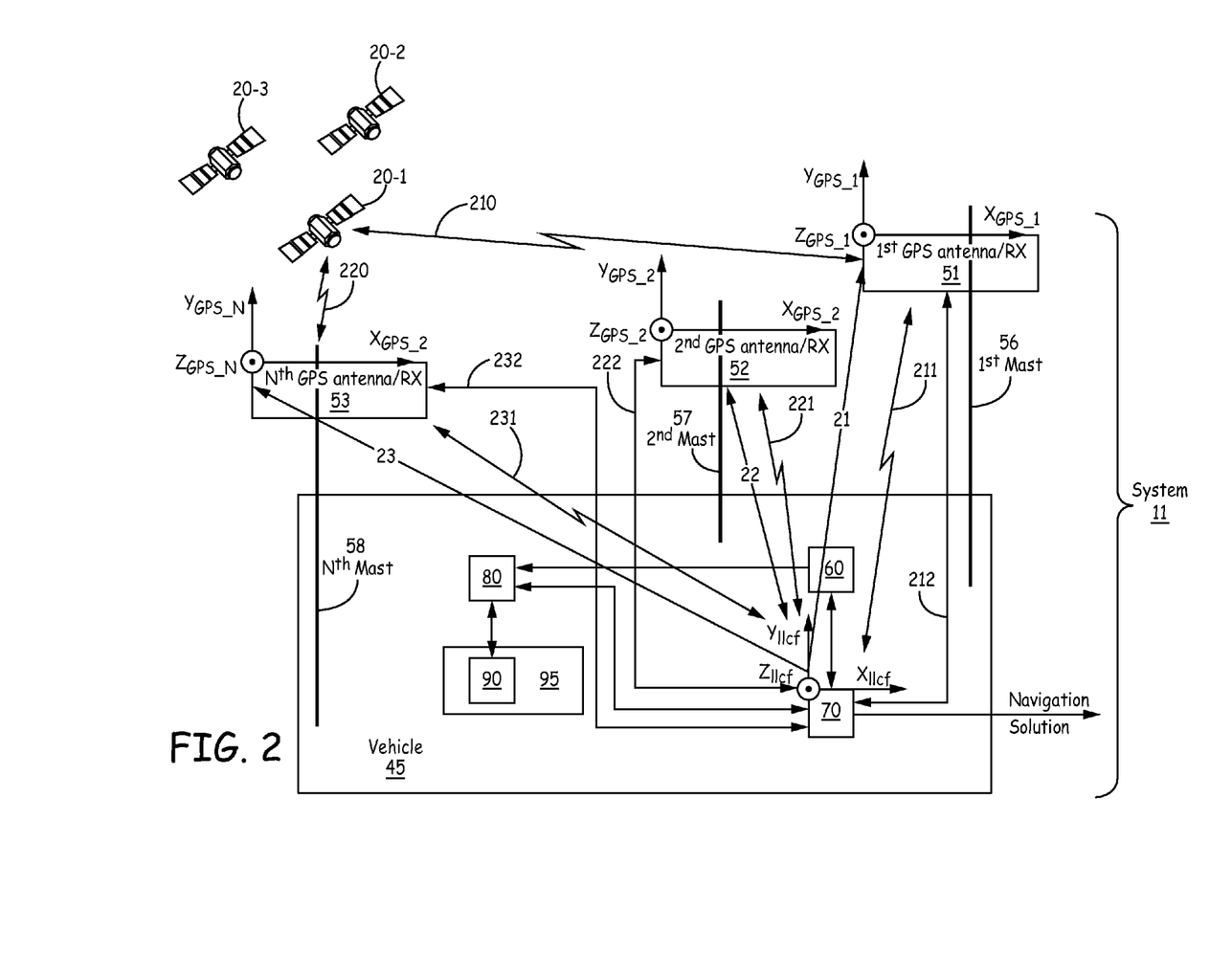
FIG. 2 is a block diagram of an embodiment of a system to calibrate a plurality of lever arms in real-time.

FIG. 2 is block diagram of an embodiment of a system 11 to calibrate a plurality of lever arms 21-23 in real-time. The plurality of lever arms includes a first lever arm 21 and a second lever arm 22, and an $N^{th}$ lever arm 23, where N is a positive integer. The system 11 differs from system 10 of FIG. 1 in that there are N GPS antenna/receivers 51, 52, and 53 in the vehicle 45 rather than the single GPS antenna/receiver 50 of FIG. 1. System 11 includes inertial navigation system 70, a first GPS antenna/receiver 51 attached to a first mast 56, a second GPS antenna/receiver 52 attached to a second mast 57, and a third GPS antenna/receiver 53 attached to an $N^{th}$ mast 58, the processor 80, the Kalman filter 90 in the storage medium 95, and inertial navigation sensors 60. In one implementation of this embodiment, N equals two and the system 11 includes two GPS antenna/receivers 51 and 52.

As shown in FIG. 2, the first GPS antenna/receiver 51 is communicatively coupled via wireless communication link 210 to satellite 20-1 and the $N^{th}$ GPS antenna/receiver 53 is communicatively coupled via wireless communication link 220 to satellite 20-1. The GPS antenna/receiver 52 is communicatively coupled via a wireless communication link, which is not shown to simplify the drawing, to satellite 20-1. In one implementation of this embodiment, the GPS antenna/receivers 51-53 are also communicatively coupled to one or more other satellites represented generally at 20-2 and 20-3 via communication links that are not shown.

The inertial navigation system 70 is communicatively coupled to the first GPS antenna/receiver 51 via wireless communication link 211 and/or hardwired communication link 212. The inertial navigation system 70 is communicatively coupled to the second GPS antenna/receiver 52 via wireless communication link 221 and/or hardwired communication link 222. The inertial navigation system 70 is communicatively coupled to the Nth GPS antenna/receiver 53 via wireless communication link 231 and/or hardwired communication link 232.

The Kalman filter 90 and inertial navigation system 70 in system 11 is similar in function and structure to the Kalman filter 90 and inertial navigation system 70 in system 10 shown in FIG. 1 as described above.

Processor 80 and the Kalman filter 90 include or function with software programs, firmware or other computer readable instructions for carrying out various methods, process tasks, calculations, and control functions, used in the systems 10 and 11 to calibrate a lever arm. These instructions are typically stored on any appropriate computer readable medium (e.g., storage medium 95) used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a communication link.

The systems 10 and 11 are used to calibrate at least one lever arm between at least one respective global positioning system (GPS) antenna/receiver and a communicatively coupled inertial navigation system in real-time. The signals from the at least one GPS antenna/receiver (e.g., GPS 50-53) are received at the inertial navigation system 70 communicatively coupled to the Kalman filter 90. Then the Kalman filter 90 estimates at least one fixed lever arm component while accounting for a bending motion of the lever arm (e.g., lever arm 20-23) based on the received signals received from the GPS antenna/receiver (e.g., GPS 50-53). In one implementation of this embodiment, the bending motion is due to wind flexing the mast (e.g., mast 56-58) supporting the GPS antenna/receiver (e.g., GPS 50-53). In another implementation of this embodiment, the bending motion is due to body bending that can exist with longer distance lever arms. An embodiment of the process and algorithms used to estimate at least one fixed lever arm component while accounting for the bending motion of the lever arm is now described in detail with reference to system 11 shown in FIG. 2.

The inertial navigation system 70 is positioned in a local level computational frame (llcf) at a first position ($x_{llcf}$, $y_{llcf}$, $z_{llcf}$) on the vehicle 45. The local-level computational frame is a right-handed coordinate frame with the z axis pointing down along the local geodetic vertical while the x and y axes are orthogonal to the z in the horizontal plane with an arbitrary azimuth orientation (angle from north). The first GPS antenna/receiver 51 is positioned at a second position ($x_{GPS\_1}$, $y_{GPS\_1}$, $z_{GPS\_1}$) on the vehicle 45. The first lever arm 21 is the difference between the first position ($x_{llcf}$, $y_{llcf}$, $z_{llcf}$) of the inertial navigation system 70 and the second position ($x_{GPS\_1}$, $y_{GPS\_1}$, $z_{GPS\_1}$) of the first GPS antenna/receiver 51. The second GPS antenna/receiver 52 is positioned at a third position ($x_{GPS\_2}$, $y_{GPS\_2}$, $z_{GPS\_2}$) on the vehicle 45. The second lever arm 22 is the difference between the first position ($x_{llcf}$, $y_{llcf}$, $z_{llcf}$) and the third position ($x_{GPS\_2}$, $y_{GPS\_2}$, $z_{GPS\_2}$). The third GPS antenna/receiver 53 is positioned at a fourth position ($x_{GPS\_3}$, $y_{GPS\_3}$, $z_{GPS\_3}$) on the vehicle 45.

The third lever arm 23 is the difference between the first position ($x_{llcf}$, $y_{llcf}$, $z_{llcf}$) and the fourth position ($x_{GPS\_3}$, $y_{GPS\_3}$, $z_{GPS\_3}$). The algorithms shown below refer to the first lever arm 21 and the second lever arm 22. In one implementation of this embodiment, there is no third GPS antenna/receiver 53 in the system 11.

In system 11, the Kalman filter 90 is configured when executed by the processor 80 to: 1) implement an expanded state transition matrix including a first expanded state-matrix diagonal element $\Phi_{la1,la1}$ associated with a first fixed lever arm and associated with a first bent lever arm; 2) implement the expanded state transition matrix including a second expanded state-matrix diagonal element $\Phi_{la2,la2}$ associated with a second fixed lever arm and associated with a second bent lever arm; 3) implement the expanded noise covariance matrix including a first-expanded noise-matrix diagonal element $Q_{la1,la1}$ associated with the first fixed lever arm and associated with the first bent lever arm; 4) implement the expanded noise covariance matrix including a second-expanded noise-matrix diagonal element $Q_{la2,la2}$ associated with the second fixed lever arm and associated with the second bent lever arm; 5) estimate a first lever arm 21 (represented generally at $r^B_{lever\_arm1}$ in the equations below) in real-time based on the implementing of the expanded state transition matrix and the expanded noise covariance matrix; and 6) estimate a second lever arm 22 (represented generally at $r^B_{lever\_arm2}$ in the equations below) in real-time based on the implementing of the expanded state transition matrix and the expanded noise covariance matrix.

The first expanded state-matrix diagonal element associated with the first fixed lever arm and associated with the first bent lever arm comprises a 6-by-6 first-expanded state sub-matrix $\Phi_{la1,la1}$, which is described below. The first-expanded noise-matrix diagonal element associated with the first fixed lever arm and associated with the first bent lever arm comprises a 6-by-6 first-expanded noise sub-matrix $Q_{la1,la1}$, which is described below. The second expanded state-matrix diagonal element associated with the second fixed lever arm and associated with the second bent lever arm comprises a 6-by-6 first-expanded state sub-matrix $\Phi_{la2,la2}$, which is described below. The second-expanded noise-matrix diagonal element $Q_{la2,la2}$ associated with the second fixed lever arm and associated with the second bent lever arm comprises a 6-by-6 second-expanded noise sub-matrix $Q_{la2,la2}$, which is described below.

The algorithms described herein are implemented in the Kalman filter 90 to calibrate the lever arm 20 between the GPS antenna/receiver 50 and the inertial navigation system 70 after the inertial navigation system 70 is installed in a vehicle 45, such as a boat or an aircraft. The algorithms use the inertial (gyro and accel) measurements, and GPS measurements to obtain a real-time measurement of the lever arm. This real-time measurement of the lever arm removes the need for a survey or other form of measuring the distance between the INS and GPS. With high accuracy GPS (e.g., real-time kinematic (RTK)), the algorithm provides a lever arm that is accurate to within 5 centimeters or less. The real-time measurements are done with a Kalman filter 90 that has states for the fixed lever arm and also has lever arm bending states to account for body bending that can exist with longer distance lever arms.

The algorithms to provide a real-time estimate of the first lever arm 21 and the second lever arm 22 are now presented. As is understandable to one skilled in the art, the algorithms shown below can be modified to provide a real-time estimate of a single lever arm 20 (FIG. 1) by excluding both the second expanded state-matrix diagonal element $\phi_{la2,la2}$ and the second-expanded noise-matrix diagonal element $Q_{la2,la2}$. Therefore, the algorithms to provide a real-time estimate of a single lever arm 20 (FIG. 1) are not explicitly shown herein. Likewise, as is understandable to one skilled in the art, the algorithms shown below can be modified to provide a real-time estimate of an additional (third) lever arm 23 by adding an additional (third) expanded state-matrix diagonal element and a third-expanded noise-matrix diagonal element.

The error modes in a GPS system, which systems 10 and 11 deal with, are now outlined. The measurement model for the GPS position measurement in the INS mode is $$\Delta r = \tilde{r}_{gps}^L - \hat{r}^L. \tag{1}$$

The term $\tilde{r}_{gps}^L$ is the GPS-measured position of the antenna in the local-level computational frame and is given by $$\begin{aligned}\tilde{r}_{gps}^L &= (\hat{C}_L^E)^T \tilde{r}_{gps}^E \\ &= [(C_L^E)^T + (\delta C_L^E)^T][r^E + \delta r_{gps}^E] \\ &= r^L - \delta r_x u_x^L - \delta r_y u_y^L + \delta r_{gps}^L\end{aligned} \tag{2}$$

where
$\tilde{r}_{gps}^E$ = measured position of the GPS antenna in the Earth-centered, Earth-fixed (ECEF) frame or Earth frame
$r^E$ = true position of the GPS antenna in the Earth-centered, Earth-fixed (ECEF) frame or Earth frame
$\hat{C}_L^E$ = estimated local-level to Earth frame transformation matrix
$C_L^E$ = true local-level to Earth frame transformation matrix
$\delta r_x$ = error of the x component of the estimated position of the INS in the local-level frame
$\delta r_y$ = error of the y component of the estimated position of the INS in the local-level frame
$u_x^L$ = unit vector along the x axis of the local-level frame
$u_y^L$ = unit vector along the y axis of the local-level frame The term $\hat{r}^L$ is the estimated (hybrid) position of the GPS antenna (e.g., GPS antenna/receiver 50, 51, and/or 52) in the local-level computational frame (llcf) and is given by $$\begin{aligned}\hat{r}^L &= \hat{r}_{hyb}^L + \hat{C}_B^L \hat{r}_{lever\_arm}^B \\ &= r^L - \delta r_z u_z^L + C_B^L \delta r_{lever\_arm}^B + \delta C_B^L r_{lever\_arm}^B + \delta C_B^L \delta r_{lever\_arm}^B\end{aligned} \tag{3}$$

where
$\hat{r}_{hyb}^L$ = estimated position of the inertial reference system (IRS)
$r_{lever\_arm}^B$ = lever arm from the IRS to the GPS antenna in the Earth frame
$\hat{C}_B^L$ = estimated body to local level frame transformation matrix
$\delta r_z$ = error of the z component of the estimated position of the INS in the local-level frame
$u_z^L$ = unit vector along the z (down) axis of the local-level frame Taking the difference, the measurement error model becomes $$\begin{aligned}\Delta r &= -\delta r_x u_x^L - \delta r_y u_y^L + \delta r_{gps}^L - \delta r_z u_z^L - C_B^L \delta r_{lever\_arm}^B - \\ &\quad \delta C_B^L r_{lever\_arm}^B - \delta C_B^L \delta r_{lever\_arm}^B \\ &= \delta r_{gps}^L - \delta r^L - C_B^L \delta r_{lever\_arm}^B - \delta C_B^L r_{lever\_arm}^B - \delta C_B^L \delta r_{lever\_arm}^B\end{aligned} \tag{4}$$

where $\delta r^L$ = the INS (hybrid) position error vector (represented by the position error states of the filter).

This can be re-written in terms of the small angle attitude error vector as follows $$\Delta r = \delta r^L_{gps} - \delta r^L - C^L_B \delta r^B_{lever\_arm} + \{\gamma\} C^L_B r^B_{lever\_arm} + \{\gamma\} C^L_B \delta r^B_{lever\_arm} \quad (5)$$
$$= \delta r^L_{gps} - \delta r^L - C^L_B \delta r^B_{lever\_arm} - \{C^L_B r^B_{lever\_arm}\}\gamma + \{\gamma\} C^L_B \delta r^B_{lever\_arm}$$

where $$\delta C^L_B = -\{\gamma\} C^L_B$$

$\gamma$ = attitude error vector of small angle rotations of the estimated local level frame relative to the true frame $\{\gamma\}$ = skew-symmetric matrix form of the vector $$\gamma = \begin{bmatrix} 0 & -\gamma_z & \gamma_y \\ \gamma_z & 0 & -\gamma_x \\ -\gamma_y & \gamma_x & 0 \end{bmatrix}.$$

The last term in equation 5 is non-linear but can be ignored once the attitude error is sufficiently small or lever arm error is sufficiently small. If the initial lever arm error is large (relative to the expected GPS position bias and noise), then the lever arm states should be modeled as consider states until the attitude error is sufficiently small.

The GPS position error components in the local-level frame are modeled as biases (modeled as first-order Gauss-Markov processes) plus white noise as follows.

$$\delta r_{gps} = \delta r_{GPS\_pos\_bias} + \delta r_{GPS\_pos\_noise}. \quad (6)$$

In order to express equation 5 in terms of the filter error states, equation 5 is expanded as follows (ignoring the non-linear term):

$$\Delta r = \delta r_{GPS\_pos\_bias} + \delta r_{GPS\_pos\_noise} - \delta r^L - C^L_B \delta r^B_{lever\_arm} - \quad (7)$$
$$\{C^L_B r^B_{lever\_arm}\}\gamma$$
$$= \delta r_{GPS\_pos\_bias} + \delta r_{GPS\_pos\_noise} - \delta r^L - C^L_B \delta r^B_{lever\_arm} -$$
$$\{C^L_B r^B_{lever\_arm}\}(\varepsilon - \psi)$$
$$= \delta r_{GPS\_pos\_bias} + \delta r_{GPS\_pos\_noise} - \delta r^L - C^L_B \delta r^B_{lever\_arm} +$$
$$\begin{bmatrix} 0 & -l_z & l_y \\ l_z & 0 & -l_x \\ -l_y & l_x & 0 \end{bmatrix} \left( \psi - \frac{1}{R_e} \begin{bmatrix} \delta r_y \\ -\delta r_x \\ 0 \end{bmatrix} \right)$$

where $$\begin{bmatrix} l^L_x \\ l^L_y \\ l^L_z \end{bmatrix} = r^L_{lever\_arm} = C^L_B r^L_{lever\_arm} \quad (8)$$

$$\psi = \varepsilon - \gamma$$

$$\varepsilon = \frac{1}{R_e} \begin{bmatrix} \delta r_y \\ -\delta r_x \\ 0 \end{bmatrix} = \text{angular position error in the local level frame}$$

$R_e$ = Earth's radius

Note that the model derived here assumes that the GPS position is available in the E frame. Since not all GPS receivers transmit that quantity, the GPS latitude, longitude and altitude can be used to compute the earth frame position components as known to one skilled in the art.

In order for real-time measurements to account for lever arm bending (also referred to as body bending) that can exist with longer distance lever arms (e.g., distances of greater than 75 feet), the Kalman filter 90 processes a state transition matrix, which includes sub-matrices to incorporate the bending. The prior art Kalman filters process prior art state transition matrices that do not include any states for the bending of the respective lever arms. In order to distinguish the prior art state transition matrix from the state transition matrix disclosed herein, the state transition matrix described herein is referred to as an "expanded state transition matrix Φ" or a "modified state transition matrix Φ". The clock states and the pseudo-range bias states, which are processed by the prior art Kalman filters, are not defined in detail below, since they are known to one skilled in the art, and are not applicable here since we are assuming GPS position measurements rather than pseudo-range measurements.

For the case of two GPS receivers (e.g., first GPS antenna/receiver 51 attached to a first mast 56, second GPS antenna/receiver 52 attached to second mast 57 shown in FIG. 2), the expanded linearized state vector Δx assumed here consists of 34 states, 12 of which are associated with the estimation of the 2 lever arms, and is given by $$\Delta x = \begin{bmatrix} \psi \\ v \\ r \\ b_g \\ b_a \\ b_{alt} \\ b_{rgps1} \\ b_{rgps2} \\ l_1 \\ l_2 \end{bmatrix} = \begin{bmatrix} 3 \times 1 \text{ attitude error state vector} \\ 3 \times 1 \text{ velocity error state vector} \\ 3 \times 1 \text{ position error state vector} \\ 3 \times 1 \text{ gyro bias state vector} \\ 3 \times 1 \text{ accelerometer bias state vector} \\ 1 \text{ baro altitude bias state} \\ 3 \times 1 \text{ GPS receiver 1 position bias state vector} \\ 3 \times 1 \text{ GPS receiver 2 position bias state vector} \\ 6 \times 1 \text{ GPS receiver 1 lever arm error state vector (3} \times 1 \text{ fixed, 3} \times 1 \text{ bending)} \\ 6 \times 1 \text{ GPS receiver 2 lever arm error state vector (3} \times 1 \text{ fixed, 3} \times 1 \text{ bending)} \end{bmatrix}. \quad (9)$$

The expanded state transition matrix $\Phi$ for the system 11 shown in FIG. 2 is shown in equation 10 as follows:

$$\Phi = \begin{bmatrix} \Phi_{\psi,\psi} & 0_{3\times 3} & 0_{3\times 3} & \Phi_{\psi,gb} & 0_{3\times 3} & & & & & \\ \Phi_{v,\psi} & \Phi_{v,v} & \Phi_{v,r} & \Phi_{v,gb} & \Phi_{v,ab} & 0_{9\times 1} & 0_{9\times 3} & 0_{9\times 3} & 0_{9\times 6} & 0_{9\times 6} \\ \Phi_{r,\psi} & \Phi_{r,v} & \Phi_{r,r} & \Phi_{r,gb} & \Phi_{r,ab} & & & & & \\ \Phi_{gb,\psi} & 0_{3\times 3} & 0_{3\times 3} & \Phi_{gb,gb} & 0_{3\times 3} & 0_{3\times 1} & 0_{3\times 3} & 0_{3\times 3} & 0_{3\times 6} & 0_{3\times 6} \\ 0_{3\times 9} & & & 0_{3\times 3} & \Phi_{ab,ab} & 0_{3\times 1} & 0_{3\times 3} & 0_{3\times 3} & 0_{3\times 6} & 0_{3\times 6} \\ 0_{1\times 9} & & & 0_{1\times 3} & 0_{1\times 3} & \phi_{altb,altb} & 0_{1\times 3} & 0_{1\times 3} & 0_{1\times 6} & 0_{1\times 6} \\ 0_{3\times 9} & & & 0_{3\times 3} & 0_{3\times 3} & 0_{3\times 1} & \Phi_{rgps1,rgps1} & 0_{3\times 3} & 0_{3\times 6} & 0_{3\times 6} \\ 0_{3\times 9} & & & 0_{3\times 3} & 0_{3\times 3} & 0_{3\times 1} & 0_{3\times 3} & \Phi_{rgps2rgps2} & 0_{3\times 6} & 0_{3\times 6} \\ 0_{6\times 9} & & & 0_{6\times 3} & 0_{6\times 3} & 0_{6\times 1} & 0_{6\times 3} & 0_{6\times 3} & \Phi_{la1,la1} & 0_{6\times 6} \\ 0_{6\times 9} & & & 0_{6\times 3} & 0_{6\times 3} & 0_{6\times 1} & 0_{6\times 3} & 0_{6\times 3} & 0_{6\times 6} & \Phi_{la2,la2} \end{bmatrix} \quad (10)$$

where $$\Phi_{rgps1,rgps1} = e^{-T/\tau_{GPS1\_pos\_bias}} I_3 = \begin{bmatrix} e^{-T/\tau_{GPS1\_pos\_bias}} & 0 & 0 \\ 0 & e^{-T/\tau_{GPS1\_pos\_bias}} & 0 \\ 0 & 0 & e^{-T/\tau_{GPS1\_pos\_bias}} \end{bmatrix} \quad (11)$$

$$\Phi_{rgps2,rgps2} = e^{-T/\tau_{GPS2\_pos\_bias}} I_3 = \begin{bmatrix} e^{-T/\tau_{GPS2\_pos\_bias}} & 0 & 0 \\ 0 & e^{-T/\tau_{GPS2\_pos\_bias}} & 0 \\ 0 & 0 & e^{-T/\tau_{GPS2\_pos\_bias}} \end{bmatrix} \quad (12)$$

$$\Phi_{la1,la1} = \begin{bmatrix} \Phi_{la1\_fixed,la1\_fixed} & 0_{3\times 3} \\ 0_{3\times 3} & \Phi_{la1\_bend,la1\_bend} \end{bmatrix} \quad (13)$$

$$\Phi_{la2,la2} = \begin{bmatrix} \Phi_{la2\_fixed,la2\_fixed} & 0_{3\times 3} \\ 0_{3\times 3} & \Phi_{la2\_bend,la2\_bend} \end{bmatrix} \quad (14)$$

$$\Phi_{la1\_fixed,la1\_fixed} = e^{-T/\tau\tau_{GPS1\_lever\_arm0}} I_3 = \begin{bmatrix} e^{-T/\tau\tau_{GPS1\_lever\_arm0}} & 0 & 0 \\ 0 & e^{-T/\tau\tau_{GPS1\_lever\_arm0}} & 0 \\ 0 & 0 & e^{-T/\tau\tau_{GPS1\_lever\_arm0}} \end{bmatrix} \quad (15)$$

$$\Phi_{la2\_fixed,la2\_fixed} = e^{-T/\tau\tau_{GPS2\_lever\_arm0}} I_3 = \begin{bmatrix} e^{-T/\tau\tau_{GPS2\_lever\_arm0}} & 0 & 0 \\ 0 & e^{-T/\tau\tau_{GPS2\_lever\_arm0}} & 0 \\ 0 & 0 & e^{-T/\tau\tau_{GPS2\_lever\_arm0}} \end{bmatrix} \quad (16)$$

$$\Phi_{la1\_bend,la1\_bend} = e^{-T/\tau_{GPS1\_lever\_arm\_bend}} I_3 = \begin{bmatrix} e^{-T/\tau_{GPS1\_lever\_arm\_bend}} & 0 & 0 \\ 0 & e^{-T/\tau_{GPS1\_lever\_arm\_bend}} & 0 \\ 0 & 0 & e^{-T/\tau_{GPS1\_lever\_arm\_bend}} \end{bmatrix} \quad (17)$$

$$\Phi_{la2\_bend,la2\_bend} = e^{-T/\tau_{GPS2\_lever\_arm\_bend}} I_3 = \begin{bmatrix} e^{-T/\tau_{GPS2\_lever\_arm\_bend}} & 0 & 0 \\ 0 & e^{-T/\tau_{GPS2\_lever\_arm\_bend}} & 0 \\ 0 & 0 & e^{-T/\tau_{GPS2\_lever\_arm\_bend}} \end{bmatrix}. \quad (18)$$

Likewise, in order for real-time measurements to account for lever arm bending that can exist with longer distance lever arms, the Kalman filter described herein processes a noise covariance matrix, which includes sub-matrices to incorporate the bending. The prior art Kalman filters process prior art noise covariance matrices that do not include any noise for the bending of the respective lever arms. In order to distinguish the prior art noise covariance matrix from the noise covariance matrix disclosed herein, the noise covariance matrix disclosed herein is referred to as an "expanded noise covariance matrix Q" or a "modified noise covariance matrix Q". Only those sub-matrices that are in the expanded noise covariance matrix and are not in the prior art noise covariance matrix are defined in detail below.

The expanded noise covariance matrix Q for the system 11 shown in FIG. 2 is:

The fixed lever arm states assume a relatively short correlation time. The short correlation time keeps the estimates (and uncertainties) from responding to the initial activation of these states and keeps the estimates (and uncertainties) from responding to noisy heading estimates. If the estimates (and uncertainties) were to respond to the initial activation of the fixed lever arm states, the Kalman filter 90 would be fooled into thinking these lever arm errors are observable. Likewise, if the estimates (and uncertainties) were to respond to noisy $$Q = \begin{bmatrix} Q_{\psi,\psi} & 0_{3\times3} & 0_{3\times3} & & & & & & & \\ 0_{3\times3} & Q_{v,v} & 0_{3\times3} & 0_{9\times3} & 0_{9\times3} & 0_{9\times1} & 0_{9\times3} & 0_{9\times3} & 0_{9\times6} & 0_{9\times6} \\ 0_{3\times3} & 0_{3\times3} & Q_{r,r} & & & & & & & \\ \hline & 0_{3\times9} & & Q_{gb,gb} & 0_{3\times3} & 0_{3\times1} & 0_{3\times3} & 0_{3\times3} & 0_{3\times6} & 0_{3\times6} \\ \hline & 0_{3\times9} & & 0_{3\times3} & Q_{ab,ab} & 0_{3\times1} & 0_{3\times3} & 0_{3\times3} & 0_{3\times6} & 0_{3\times6} \\ \hline & 0_{1\times9} & & 0_{1\times3} & 0_{1\times3} & q_{altb,altb} & 0_{1\times3} & 0_{1\times3} & 0_{1\times6} & 0_{1\times6} \\ \hline & 0_{3\times9} & & 0_{3\times3} & 0_{3\times3} & 0_{3\times1} & Q_{rgps1,rgps1} & 0_{3\times3} & 0_{3\times6} & 0_{3\times6} \\ \hline & 0_{3\times9} & & 0_{3\times3} & 0_{3\times3} & 0_{3\times1} & 0_{3\times3} & Q_{rgps2,rgps2} & 0_{3\times6} & 0_{3\times6} \\ \hline & 0_{6\times9} & & 0_{6\times3} & 0_{6\times3} & 0_{6\times1} & 0_{6\times3} & 0_{6\times3} & Q_{la1,la1} & 0_{6\times6} \\ \hline & 0_{6\times9} & & 0_{6\times3} & 0_{6\times3} & 0_{6\times1} & 0_{6\times3} & 0_{6\times3} & 0_{6\times6} & Q_{la2,la2} \end{bmatrix} \quad (19)$$

where $$Q_{rgps1,rgps1} = \begin{bmatrix} \sigma^2_{GPS1\_pos\_bias\_xy} & 0 & 0 \\ 0 & \sigma^2_{GPS1\_pos\_bias\_xy} & 0 \\ 0 & 0 & \sigma^2_{GPS1\_pos\_bias\_z} \end{bmatrix} \left(1 - e^{-2T/\tau_{GPS1\_pos\_bias}}\right) \quad (20)$$

$$Q_{rgps2,rgps2} = \begin{bmatrix} \sigma^2_{GPS2\_pos\_bias\_xy} & 0 & 0 \\ 0 & \sigma^2_{GPS2\_pos\_bias\_xy} & 0 \\ 0 & 0 & \sigma^2_{GPS2\_pos\_bias\_z} \end{bmatrix} \left(1 - e^{-2T/\tau_{GPS2\_pos\_bias}}\right) \quad (21)$$

$$Q_{la1,la1} = \begin{bmatrix} Q_{la1\_fixed,la1\_fixed} & 0_{3\times3} \\ 0_{3\times3} & Q_{la1\_bend,la1\_bend} \end{bmatrix} \quad (22)$$

$$Q_{la2,la2} = \begin{bmatrix} Q_{la2\_fixed,la2\_fixed} & 0_{3\times3} \\ 0_{3\times3} & Q_{la2\_bend,la2\_bend} \end{bmatrix} \quad (23)$$

$$Q_{la1\_fixed,la1\_fixed} = e^{-T/\tau_{GPS1\_lever\_arm0}} \quad (24)$$

$$I_3 = \begin{bmatrix} \sigma^2_{GPS1\_lever\_arm0}(1) & 0 & 0 \\ 0 & \sigma^2_{GPS1\_lever\_arm0}(2) & 0 \\ 0 & 0 & \sigma^2_{GPS1\_lever\_arm0}(3) \end{bmatrix} \left(1 - e^{-2T/\tau_{GPS1\_lever\_arm0}}\right)$$

$$Q_{la2\_fixed,la2\_fixed} = \begin{bmatrix} \sigma^2_{GPS2\_lever\_arm0}(1) & 0 & 0 \\ 0 & \sigma^2_{GPS2\_lever\_arm0}(2) & 0 \\ 0 & 0 & \sigma^2_{GPS2\_lever\_arm0}(3) \end{bmatrix} \quad (25)$$

$$\left(1 - e^{-2T/\tau_{GPS2\_lever\_arm0}}\right)$$

$$Q_{la1\_bend,la1\_bend} = \begin{bmatrix} \sigma^2_{GPS1\_lever\_arm\_bend\_xy} & 0 & 0 \\ 0 & \sigma^2_{GPS1\_lever\_arm\_bend\_xy} & 0 \\ 0 & 0 & \sigma^2_{GPS1\_lever\_arm\_bend\_z} \end{bmatrix} \quad (26)$$

$$\left(1 - e^{-2T/\tau_{GPS1\_lever\_arm\_bend}}\right)$$

$$Q_{la2\_bend,la2\_bend} = \begin{bmatrix} \sigma^2_{GPS2\_lever\_arm\_bend\_xy} & 0 & 0 \\ 0 & \sigma^2_{GPS2\_lever\_arm\_bend\_xy} & 0 \\ 0 & 0 & \sigma^2_{GPS1\_lever\_arm\_bend\_z} \end{bmatrix} \quad (27)$$

$$\left(1 - e^{-2T/\tau_{GPS2\_lever\_arm\_bend}}\right).$$

heading estimates, the Kalman filter 90 would be fooled into thinking these lever arm errors are observable.

Thus, the Kalman filter 90 does not attempt to estimate the fixed lever arm states until there is significant motion such that the errors are truly observable. Because of this short correlation time, however, the Kalman filter 90 quickly loses the calibration when the motion stops. To prevent loss of calibration, while the fixed lever arm estimates are converging, the incremental estimates are accumulated and the model steady-state uncertainties reduced to the current error state estimation uncertainties to "lock in" the calibration and keep the uncertainties from growing back to the original values. In addition, once the convergence and accumulation of the incremental lever arm estimates has begun, the correlation time increases to its more natural value. This allows for an even better calibration of the lever arms 21 and 22.

The sigma of the current lever arm is determined for iterations in which: i=1 to 2 and j=1 to 3. The value of k and the sigma of the current lever arm are described mathematically as follow for all iterations through i and j.

$$k = 22 + 6(i-1) + j$$

$$\sigma_{lever\_arm\_current} = \sqrt{P(k,k)}. \tag{28}$$

If $$\sigma_{lever\_arm\_current} \leq 0.9 \sigma_{GPS(i)\_lever\_arm0}(j), \tag{29}$$

then $$\sigma_{GPS(i)\_lever\_arm0}(j) = \sigma_{lever\_arm\_current} \tag{30}$$

and $$\tau_{GPS(i)\_lever\_arm0}(j) = 3.6e4. \tag{31}$$

A new expanded noise covariance matrix Q is computed for each iteration using:

$$\sigma_{GPSi\_lever\_arm0}(j) \text{ and } \tau_{GPS(i)\_lever\_arm0}(j). \tag{32}$$

A new expanded state transition matrix Φ is computed using:

$$\tau_{GPS(i)\_lever\_arm0}(j). \tag{33}$$

For each iteration, the GPS lever arm is estimated and the Δx is reset to zero as follows:

$$r_{GPS(i)\_lever\_arm\_est}(j) = r_{GPS(i)\_lever\_arm\_est}(j) - \Delta x(k)$$

$$\Delta x(k) = 0. \tag{34}$$

To compute the position residuals, the current inertial reference system (IRS) position and velocity estimates in the Earth frame are first determined. The current inertial position is known through the position direction cosine matrix (which contains latitude and longitude information) and the stabilized altitude estimate. Because the actual measurements from the GPS receiver are in reference to the position of the GPS antenna, the current inertial position is translated to the position of the GPS antenna prior to calculating measurement residuals.

As shown in FIG. 2, the vehicle 45 is equipped with the first GPS antenna/receiver 51 and the second GPS antenna/receiver 52. The first GPS antenna/receiver 51 is also referred to herein as "GPS receiver 1", "receiver 1", and "first GPS receiver 51". Likewise, the second GPS antenna/receiver 52 is also referred to herein as "GPS receiver 2", "receiver 2", and "second GPS receiver 52". The following discussion is applied to both the first GPS antenna/receiver 51 and the second GPS antenna/receiver 52. However, if there is only a single GPS antenna/receiver 50 as shown in FIG. 1, then only the discussion with reference to the first receiver 51 is applicable.

The following parameters for the GPS Position Measurements for the INS Mode are assumed:

$t_{gps1\_meas}, t_{gps2\_meas}$=System times at which the position measurements were made from GPS receivers 1 and 2

$\lambda_{gps1}, \lambda_{gps2}$=Computed latitudes from GPS receivers 1 and 2

$\Lambda_{gps1}, \Lambda_{gps2}$=Computed longitudes from GPS receiver 1 and 2

$h_{gps1}, h_{gps2}$=Computed altitudes from GPS receiver 1 and 2

$v_{gps1}{}^G, v_{gps2}{}^G$=Computed velocity vector from GPS receivers 1 and 2 in geographic (north, east, down) coordinates The earth frame position and velocity referenced to the GPS antenna for both the first GPS receiver 51 and the second GPS receiver 52 are computed, where the lever arm vectors are formed from the lever arm states of the filter as follows:

$$r_{lever\_arm1}^B = r_{GPS1\_lever\_arm\_est} - (\Delta x_{la1\_fixed} + \Delta x_{la1\_bend}) \tag{35}$$

$$r_{lever\_arm2}^B = r_{GPS2\_lever\_arm\_est} - (\Delta x_{la2\_fixed} + \Delta x_{la2\_bend})$$

and $$\Delta x_{la1\_fixed} = GPS1 \text{ fixed lever arm estimate} = \begin{bmatrix} \Delta x(23) \\ \Delta x(24) \\ \Delta x(25) \end{bmatrix} \tag{36}$$

$$\Delta x_{la1\_bend} = GPS1 \text{ lever arm body-bending estimate} = \begin{bmatrix} \Delta x(26) \\ \Delta x(27) \\ \Delta x(28) \end{bmatrix} \tag{37}$$

$$\Delta x_{la2\_fixed} = GPS2 \text{ fixed lever arm estimate} = \begin{bmatrix} \Delta x(29) \\ \Delta x(30) \\ \Delta x(31) \end{bmatrix} \tag{38}$$

$$\Delta x_{la2\_bend} = GPS2 \text{ lever arm body-bending estimatic} = \begin{bmatrix} \Delta x(32) \\ \Delta x(33) \\ \Delta x(34) \end{bmatrix}. \tag{39}$$

The inertial positions referenced to the GPS antenna for the first GPS receiver 51 and the second GPS receiver 52 are extrapolated to the times of the GPS position measurements. The clock extrapolation does not apply. In order to correct the inertial position, the position error states must be extrapolated to the measurement times and transformed into the E frame as follows $$\Delta t_{err1} = t_{gps\_meas1} - t_{err}$$

$$\Delta t_{err2} = t_{gps\_meas2} - t_{err}$$

$$\Delta r_{extrap1} = \Delta r + \Delta v \Delta t_{err1}$$

$$\Delta r_{extrap2} = \Delta r + \Delta v \Delta t_{err2}$$

$$\Delta r_{extrap1}^E = C_L^E \Delta r_{extrap1}$$

$$\Delta r_{extrap2}^E = C_L^E \Delta r_{extrap2} \tag{40}$$

where $t_{gps\_meas1}, t_{gps\_meas2}$=times of the gps pseudo-range measurement for receivers 1 and 2

$t_{err}$=time of the error state update

Δr=position error states from filter in L frame coordinates

Δv=velocity error states from filter in L frame coordinates

The extrapolated hybrid position estimate at each receiver's antennae in E frame coordinates at this point is merely the extrapolated E frame inertial position. The transformed position error states are used to create an extrapolated error state vector. This error state vector will be used to correct the hybrid position for the residual calculation as follows:

$$r_{hyb1}^E = r_{IRS\_extrap1}^E$$

$$r_{hyb2}^E = r_{IRS\_extrap2}^E$$

$$\Delta x_{extrap1} = \Delta x$$

$$\Delta x_{extrap1}(7:9) = \Delta r_{extrap1}^E.$$

$$\Delta x_{extrap2} = \Delta x$$

$$\Delta x_{extrap2}(7:9) = \Delta r_{extrap2}^E$$

In a manner similar to the IRS position, the earth frame GPS (GPS E frame) position is computed for both the first GPS receiver 51 and the second GPS receiver 52. First, the earth-to-geographic frame transformation matrix for each of the first GPS receiver 51 and the second GPS receiver 52 is computed using its latitude, longitude, and altitude as follows:

$$C_{G1}^E = \begin{bmatrix} -\cos\Lambda_{gps1}\sin\lambda_{gps1} & -\sin\Lambda_{gps1} & -\cos\Lambda_{gps1}\cos\lambda_{gps1} \\ -\sin\Lambda_{gps1}\sin\lambda_{gps1} & \cos\Lambda_{gps1} & -\sin\Lambda_{gps1}\cos\lambda_{gps1} \\ \cos\lambda_{gps1} & 0 & -\sin\lambda_{gps1} \end{bmatrix} \quad (41)$$

$$C_{G2}^E = \begin{bmatrix} -\cos\Lambda_{gps2}\sin\lambda_{gps2} & -\sin\Lambda_{gps2} & -\cos\Lambda_{gps2}\cos\lambda_{gps2} \\ -\sin\Lambda_{gps2}\sin\lambda_{gps2} & \cos\Lambda_{gps2} & -\sin\Lambda_{gps2}\cos\lambda_{gps2} \\ \cos\lambda_{gps2} & 0 & -\sin\lambda_{gps2} \end{bmatrix}. \quad (42)$$

Then, the GPS earth frame position is computed for each of the first GPS receiver 51 and the second GPS receiver 52 as follows:

$$r_{gps1}^E = \begin{bmatrix} -r_{c1}C_{G1}^E(1,3) \\ -r_{c1}C_{G1}^E(2,3) \\ -\{(1-e^2)r_{c0\_1} + h_{gps1}\}C_{G1}^E(3,3) \end{bmatrix} \quad (43)$$

$$r_{gps2}^E = \begin{bmatrix} -r_{c2}C_{G2}^E(1,3) \\ -r_{c2}C_{G2}^E(2,3) \\ -\{(1-e^2)r_{c0\_2} + h_{gps2}\}C_{G2}^E(3,3) \end{bmatrix} \quad (44)$$

where $$r_{c0\_1} = \frac{R_e}{\sqrt{1-e^2[C_{G1}^E(3,3)]^2}} \quad (45)$$

$$r_{c0\_2} = \frac{R_e}{\sqrt{1-e^2[C_{G2}^E(3,3)]^2}} \quad (46)$$

$$r_{c1} = r_{c0\_1} + h_{gps1} \quad (47)$$

$$r_{c2} = r_{c0\_2} + h_{gps2}. \quad (48)$$

The GPS position residual vector for the first GPS receiver 51 is computed as follows:

$$\Delta r_{res1} = (C_L^E)^T(r_{gps1}^E - r_{hyb1}^E) + \begin{bmatrix} h^T(1) \\ h^T(2) \\ h^T(3) \end{bmatrix} \Delta x_{extrap1} - C_B^L r_{GPS1\_lever\_arm\_est} \quad (49)$$

where $h^T(1)$, $h^T(2)$, and $h^T(3)$ are the measurement mapping vectors for the x, y, and z position measurements for receiver 1 and are defined in the next paragraph. The x, y, and z components of the position residual measurement for receiver 1 correspond to the following scalar measurement residuals:

$$\begin{bmatrix} \Delta z(1) \\ \Delta z(2) \\ \Delta z(3) \end{bmatrix} = \Delta r_{res1}. \quad (50)$$

The position residual vector for the second GPS receiver 52 is computed as follows:

$$\Delta r_{res2} = (C_L^E)^T(r_{gps2}^E - r_{hyb2}^E) + \begin{bmatrix} h^T(4) \\ h^T(5) \\ h^T(6) \end{bmatrix} \Delta x_{extrap2} - C_B^L r_{GPS2\_lever\_arm\_est}, \quad (51)$$

where $h^T(4)$, $h^T(5)$ and $h^T(6)$ are the measurement mapping vectors for the x, y, and z position measurements for the second GPS receiver 52 and are defined below. The x, y, and z components of the position residual measurement for the second GPS receiver 52 correspond to the following scalar measurement residuals:

$$\begin{bmatrix} \Delta z(4) \\ \Delta z(5) \\ \Delta z(6) \end{bmatrix} = \Delta r_{res2}. \quad (52)$$

The GPS measurement mapping vector defines the relationship between the error states and the measurement. For the GPS position measurement for the first receiver 51, the measurement mapping vector is:

$$h^T(i_d) = [\, h_1(i_d) \quad h_2(i_d) \quad \ldots \quad h_j(i_d) \quad \ldots \quad h_{N_{dim}}(i_d)\,] \quad (53)$$

where $$h_{16+i_d}(i_d) = 1$$

$$h_{1:3}(i_d) = \begin{cases} -[\, 0 & -l_{z1}^L & l_{y1}^L\,], & i_d = 1 \\ -[\, l_{z1}^L & 0 & -l_{x1}^L\,], & i_d = 2 \\ -[-l_{y1}^L & l_{x1}^L & 0\,], & i_d = 3 \end{cases}$$

$$h_{7:9}(i_d) = \begin{cases} \left[1 + \frac{l_{z1}^L}{R_e} \quad 0 \quad 0\right], & i_d = 1 \\ \left[0 \quad 1 + \frac{l_{z1}^L}{R_e} \quad 0\right], & i_d = 2 \\ \left[-\frac{l_{x1}^L}{R_e} \quad -\frac{l_{y1}^L}{R_e} \quad 1\right], & i_d = 3 \end{cases}$$

$$h_{23:25}(i_d) = \begin{cases} C_B^L(1,1:3), & i_d = 1 \\ C_B^L(2,1:3), & i_d = 2 \\ C_B^L(3,1:3), & i_d = 3 \end{cases}$$

$$h_{26:28}(i_d) = \begin{cases} C_B^L(1,1:3), & i_d = 1 \\ C_B^L(2,1:3), & i_d = 2 \\ C_B^L(3,1:3), & i_d = 3 \end{cases}$$

$$h_j(i_d) = 0;\ j = 1, N_{dim};\ j \neq 3 + i_d;$$
$$j \neq 16 + i_d;\ j \neq 1, 3;\ j \neq 10, 12;\ j \neq 23, 28$$

$$\begin{bmatrix} l_{x1}^L \\ l_{y1}^L \\ l_{z1}^L \end{bmatrix} = C_B^L r_{lever\_arm1}^B \quad (54)$$

For the GPS position measurement for the second receiver 52, the measurement mapping vector is:

$$h^T(i_d) = [\, h_1(i_d) \quad h_2(i_d) \quad \ldots \quad h_j(i_d) \quad \ldots \quad h_{N_{dim}}(i_d) \,] \quad (55)$$

where $h_{16+i_d}(i_d) = 1$ $$h_{1:3}(i_d) = \begin{cases} -[\,0 \quad -l^L_{z2} \quad l^L_{y2}\,], & i_d = 4 \\ -[\,l^L_{z2} \quad 0 \quad -l^L_{x2}\,], & i_d = 5 \\ -[\,-l^L_{y2} \quad l^L_{x2} \quad 0\,], & i_d = 6 \end{cases}$$

$$h_{7:9}(i_d) = \begin{cases} \left[\,1 + \frac{l^L_{z2}}{R_e} \quad 0 \quad 0\,\right], & i_d = 4 \\ \left[\,0 \quad 1 + \frac{l^L_{z2}}{R_e} \quad 0\,\right], & i_d = 5 \\ \left[\,-\frac{l^L_{x2}}{R_e} \quad -\frac{l^L_{y2}}{R_e} \quad 1\,\right], & i_d = 6 \end{cases}$$

$$h_{29:31}(i_d) = \begin{cases} C^L_B(1, 1:3), & i_d = 4 \\ C^L_B(2, 1:3), & i_d = 5 \\ C^L_B(3, 1:3), & i_d = 6 \end{cases}$$

$$h_{32:34}(i_d) = \begin{cases} C^L_B(1, 1:3), & i_d = 4 \\ C^L_B(2, 1:3), & i_d = 5 \\ C^L_B(3, 1:3), & i_d = 6 \end{cases}$$

$h_j(i_d) = 0; \; j = 1, N_{dim}; \; j \neq 3 + i_d;$
$\qquad j \neq 16 + i_d; \; j \neq 1, 3; \; j \neq 10, 12; \; j \neq 29, 34$ $$\begin{bmatrix} l^L_{x2} \\ l^L_{y2} \\ l^L_{z2} \end{bmatrix} = r^L_{lever\_arm2} = C^L_B r^B_{lever\_arm2} \quad (56)$$

In the real-time implementation, there can be up to a 2 second delay from the time the filter commands a reset to the time of application of the reset in the inertial reference (IR). This delay can cause additional position error uncertainty. In addition, if there is no time mark present, there can be an additional GPS measurement timing uncertainty of about 1.0 second. This will lead to a GPS position measurement error that is velocity dependent. Therefore, the position measurement noise variance is $$r(i_d) = \qquad (57)$$

$$\begin{cases} \sigma^2_{GPS\_pos1\_noise\_xy}(i_d) + (2.0)^2 \Box \max(P(4,4), P(5,5)), & i_d = 1, 2 \\ \sigma^2_{GPS\_pos1\_noise\_z}(i_d), & i_d = 3 \\ \sigma^2_{GPS\_pos2\_noise\_xy}(i_d) + (2.0)^2 \Box \max(P(4,4), P(5,5)), & i_d = 4, 5 \\ \sigma^2_{GPS\_pos2\_noise\_z}(i_d), & i_d = 6 \\ \sigma^2_{GPS\_pos1\_noise\_xy}(i_d) + (2.0)^2 \Box \max(P(4,4), P(5,5)) + (1.0)^2 \Box v^2_g, & i_d = 1, 2 \text{ AND no time mark} \\ \sigma^2_{GPS\_pos1\_noise\_z}(i_d) + (1.0)^2 \Box v^2_g, & i_d = 3 \text{ AND no time mark} \\ \sigma^2_{GPS\_pos2\_noise\_xy}(i_d) + (2.0)^2 \Box \max(P(4,4), P(5,5)) + (1.0)^2 \Box v^2_g, & i_d = 4, 5 \text{ AND no time mark} \\ \sigma^2_{GPS\_pos2\_noise\_z}(i_d) + (1.0)^2 \Box v^2_g, & i_d = 6 \text{ AND no time mark} \end{cases}$$

To facilitate averaging of measurement times in order to determine the nominal point of the measurement update of the Kalman filters, the measurement times are saved as $$t_{meas}(i_d) = \begin{cases} t_{gps\_meas1}, & i_d = 1, 3 \\ t_{gps\_meas2}, & i_d = 4, 6 \end{cases} \quad (58)$$

In this manner, the expanded state transition matrix including two state-matrix diagonal elements associated with the bending of the lever arm and the expanded noise covariance matrix including two noise-matrix diagonal elements associated with the bending of the lever arm are processed by the Kalman filter so that a real-time calculation of the lever arm is based on the expanded state transition matrix and the expanded noise covariance matrix. Once the initial calibration is done, this process is not repeated unless the inertial navigation system 70 is moved to a new location on the vehicle 45 with reference to the GPS receiver 50 (FIG. 1) or with reference to the first GPS receiver 51 and the second GPS receiver 52 (FIG. 2).

Figure 3:
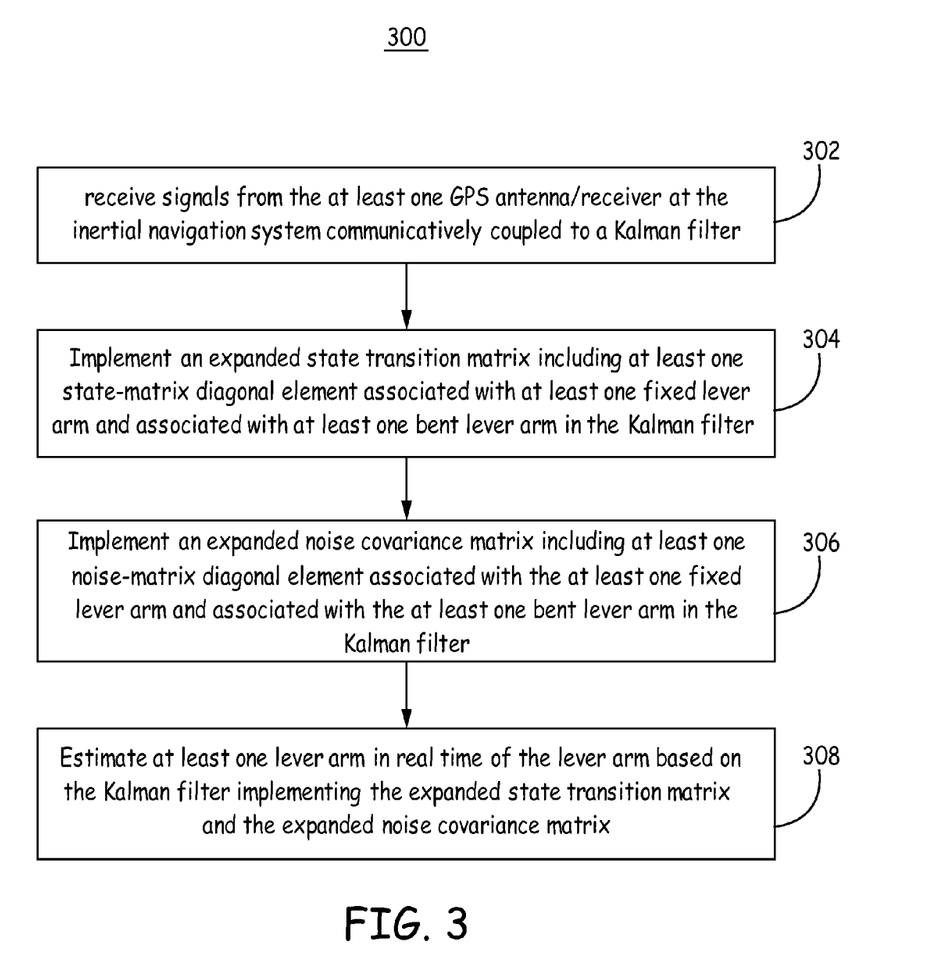
FIG. 3 is an embodiment of a method of calibrating at least one lever arm in real-time.

FIG. 3 is an embodiment of a method 300 of calibrating at least one lever arm in real-time. The method 300 is implemented in either of the systems 10 or 11 shown in FIGS. 1 and 2, respectively, implementing the algorithms described above. The method 300 can be implemented in other embodiments of systems. At block 302, signals are received from the at least one GPS antenna/receiver at the inertial navigation system communicatively coupled to a Kalman filter. Blocks 304 to 308 are implemented to estimate, in the Kalman filter, at least one fixed lever arm component while accounting for the bending motion of the lever arm based on the received signals. Specifically, at block 304, an expanded state transition matrix including at least one expanded state-matrix diagonal element $\Phi_{la,la}$ associated with at least one fixed lever arm and associated with at least one bent lever arm is implemented by a Kalman filter. At block 306, an expanded noise covariance matrix including at least one expanded noise-matrix diagonal element $Q_{la,la}$ associated with the at least one fixed lever arm and associated with the at least one bent lever arm is implemented by the Kalman filter. At block 308, the at least one lever arm $r_{gps\_lever\_arm-est}$ is estimated in real-time based on the implementing of the expanded state transition matrix and the expanded noise covariance matrix.

EXAMPLE EMBODIMENTS

Example 1 includes a method to calibrate at least one lever arm between at least one respective global positioning system (GPS) antenna/receiver and a communicatively coupled inertial navigation system, the method comprising: receiving signals from the at least one GPS antenna/receiver at the inertial navigation system communicatively coupled to a Kalman filter; and estimating, in the Kalman filter, at least one fixed lever arm component while accounting for a bending motion of the lever arm based on the received signals.

Example 2 includes the method of Example 1, wherein estimating, in the Kalman filter, the at least one fixed lever arm component while accounting for the bending motion of the lever arm comprises: implementing an expanded state transition matrix including at least one expanded state-matrix diagonal element associated with at least one fixed lever arm and associated with at least one bent lever arm; implementing an expanded noise covariance matrix including at least one expanded noise-matrix diagonal element associated with the at least one fixed lever arm and associated with the at least one bent lever arm; and estimating the at least one lever arm in real-time based on the implementing of the expanded state transition matrix and the expanded noise covariance matrix.

Example 3 includes the method of Example 2, wherein the at least one GPS antenna/receiver is a single GPS antenna/receiver, and wherein the at least one lever arm is a single lever arm, wherein implementing the expanded state transition matrix including the at least one expanded state-matrix diagonal element associated with the at least one fixed lever arm and associated with the at least one bent lever arm comprises: implementing the expanded state transition matrix including a single expanded state-matrix diagonal element associated with a single fixed lever arm and associated with a single bent lever arm.

Example 4 includes the method of Example 3, wherein implementing the expanded noise covariance matrix including the at least one expanded noise-matrix diagonal element associated with the at least one fixed lever arm and associated with the at least one bent lever arm comprises: implementing the expanded noise transition matrix including a single expanded noise-matrix diagonal element associated with the single fixed lever arm and associated with the single bent lever arm, and wherein estimating the at least one lever arm in real-time based on the implementing of the expanded state transition matrix and the expanded noise covariance matrix comprises: estimating the single lever arm in real-time based on the implementing of the expanded state transition matrix and the expanded noise covariance matrix.

Example 5 includes the method of any of Examples 3-4, further comprising: positioning the inertial navigation system in a first position on a vehicle; and positioning the single GPS antenna/receiver in a second position on the vehicle, wherein the single lever arm is the difference between the first position and the second position.

Example 6 includes the method of any of Examples 2-5, wherein the at least one GPS antenna/receiver comprises a first GPS antenna/receiver and a second GPS antenna/receiver, wherein the at least one lever arm comprises a first lever arm and a second lever arm, and wherein implementing the expanded state transition matrix including the at least one expanded state-matrix diagonal element associated with the at least one fixed lever arm and associated with the at least one bent lever arm comprises: implementing the expanded state transition matrix, wherein the expanded state transition matrix includes: a first-expanded state-matrix diagonal element associated with a first fixed lever arm and associated with a first bent lever arm; and a second-expanded state-matrix diagonal element associated with a second fixed lever arm and associated with a second bent lever arm.

Example 7 includes the method of Example 6, wherein implementing the expanded noise covariance matrix including the at least one expanded noise-matrix diagonal element associated with the at least one fixed lever arm and associated with the at least one bent lever arm comprises: implementing the expanded noise covariance matrix, wherein the expanded noise covariance matrix includes: a first-expanded noise-matrix diagonal element associated with the first fixed lever arm and associated with the first bent lever arm; and a second-expanded noise-matrix diagonal element associated with the second fixed lever arm and associated with the second bent lever arm.

Example 8 includes the method of Example 7, wherein the estimating at least one lever arm in real-time based on the implementing of the expanded state transition matrix and the expanded noise covariance matrix comprises: estimating a first lever arm; and estimating a second lever arm.

Example 9 includes the method of any of Examples 6-8, further comprising: positioning the inertial navigation system in a first position on a vehicle; positioning the first GPS antenna/receiver in a second position on the vehicle, wherein the first lever arm is the difference between the first position and the second position; and positioning the second GPS antenna/receiver in a third position on the vehicle, wherein the second lever arm is the difference between the first position and the third position.

Example 10 includes a system with a respective global positioning system (GPS) self-calibrating lever arm function, the system comprising: an inertial navigation system in a first position on a vehicle; at least one global positioning system (GPS) antenna/receiver on the vehicle, wherein at least one lever arm is the at least one respective difference between the first position and an at least one position of the respective at least one GPS antenna/receiver; and a Kalman filter executable by a processor communicatively coupled to the inertial navigation system to estimate at least one fixed lever arm component while accounting for a bending motion of the lever arm based on signals received at the inertial navigation system from the at least one GPS antenna/receiver.

Example 11 includes the system of Example 10, wherein the Kalman filter executable by the processor to estimate at least one fixed lever arm component while accounting for the bending motion of the lever arm is further configured to: implement an expanded state transition matrix including at least one expanded state-matrix diagonal element associated with at least one fixed lever arm and associated with at least one bent lever arm; implement an expanded noise covariance matrix including at least one expanded noise-matrix diagonal element associated with the at least one fixed lever arm and associated with the at least one bent lever arm; and estimate at least one lever arm in real-time based on the implementing of the expanded state transition matrix and the expanded noise covariance matrix.

Example 12 includes the system of Example 11, wherein the at least one GPS antenna/receiver is a single GPS antenna/receiver, and wherein the Kalman filter is further configured, when executed by the processor, to: implement the expanded state transition matrix including a single expanded state-matrix diagonal element associated with a single fixed lever arm and associated with a single bent lever arm; implement the expanded noise covariance matrix including a single expanded noise-matrix diagonal element associated with the single fixed lever arm and associated with the single bent lever arm; and estimate a single lever arm in real-time based on the implementing of the expanded state transition matrix and the expanded noise covariance matrix.

Example 13 includes the system of Example 12, wherein the expanded state-matrix diagonal element? associated with the single fixed lever arm and associated with the single bent lever arm comprises a 6-by-6 first-expanded state sub-matrix, and wherein the expanded noise-matrix diagonal element associated with the single fixed lever arm and associated with the single bent lever arm comprises a 6-by-6 first-expanded noise sub-matrix.

Example 14 includes the system of any of Examples 11-13, wherein the at least one lever arm includes a first lever arm and a second lever arm, and wherein the at least one GPS antenna/receiver further includes: a first GPS antenna/receiver at a second position on the vehicle, wherein the first lever arm is the difference between the first position and the second position; and a second GPS antenna/receiver at a third position on the vehicle, wherein the second lever arm is the difference between the first position and the third position, and wherein the Kalman filter is further configured when executed by the processor to: implement the expanded state transition matrix, wherein the expanded state transition matrix includes: a first expanded state-matrix diagonal element associated with a first fixed lever arm and associated with a first bent lever arm; and a second expanded state-matrix diagonal element associated with a second fixed lever arm and associated with a second bent lever arm; implement the expanded noise covariance matrix, wherein the expanded noise covariance matrix includes: a first-expanded noise-matrix diagonal element associated with the first fixed lever arm and associated with the first bent lever arm; and a second-expanded noise-matrix diagonal element associated with the second fixed lever arm and associated with the second bent lever arm.

Example 15 includes the system of Example 14, wherein, based on the implementing of the expanded state transition matrix and the expanded noise covariance matrix, the Kalman filter is further configured when executed by the processor to: estimate a first lever arm in real-time; and estimate a second lever arm in real-time.

Example 16 includes the system of any of Examples 14-15, wherein the first expanded state-matrix diagonal element? associated with the first fixed lever arm and associated with the first bent lever arm comprises a 6-by-6 first-expanded state sub-matrix, and wherein the second expanded state-matrix diagonal element associated with the second fixed lever arm and associated with the second bent lever arm comprises a 6-by-6 first-expanded state sub-matrix.

Example 17 includes the system of any of Examples 14-16, wherein the first-expanded noise-matrix diagonal element associated with the first fixed lever arm and associated with the first bent lever arm comprises a 6-by-6 first-expanded noise sub-matrix, and wherein the second-expanded noise-matrix diagonal element associated with the second fixed lever arm and associated with the second bent lever arm comprises a 6-by-6 second-expanded noise sub-matrix.

Example 18 includes the system of any of Examples 10-17, further comprising: at least one inertial navigation sensor communicatively coupled to the processor.

Example 19 includes a program product for implementing an inertial navigation system to calibrate a lever arm, the program product comprising a processor-readable medium on which program instructions are embodied, wherein the program instructions are operable, when executed by at least one processor in the inertial navigation system, to cause the inertial navigation system to: estimate at least one fixed lever arm component while accounting for the bending motion of the lever arm in the Kalman filter based on signals received from at least one GPS antenna/receiver at the inertial navigation system.

Example 20 includes the program product of Example 19, further comprising program instructions operable, when executed by at least one processor in an inertial navigation system including a single GPS antenna/receiver, to cause the inertial navigation system to: implement an expanded state transition matrix including at least one expanded state-matrix diagonal element associated with at least one fixed lever arm and associated with at least one bent lever arm; implement an expanded noise covariance matrix including at least one expanded noise-matrix diagonal element associated with the at least one fixed lever arm and associated with the at least one bent lever arm; and estimate at least one lever arm in real-time based on the implementing of the expanded state transition matrix and the expanded noise covariance matrix.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method to calibrate at least one lever arm (20) between at least one respective global positioning position (GPS) antenna/receiver (50) and a communicatively coupled inertial navigation system (70), the method comprising:
   receiving signals from the at least one GPS antenna/receiver (50) at the inertial navigation system communicatively coupled to a Kalman filter (90); and
   estimating, in the Kalman filter, at least one fixed lever arm component while accounting for a bending motion of the lever arm (20) based on the received signals by implementing an expanded state transition matrix and an expanded noise covariance matrix; and
   calibrating the at least one lever arm based on estimating the at least one fixed lever arm component.

2. The method of claim 1, wherein estimating, in the Kalman filter, the at least one fixed lever arm component while accounting for the bending motion of the lever arm comprises:
   implementing the expanded state transition matrix including at least one expanded state-matrix diagonal element associated with at least one fixed lever arm and associated with at least one bent lever arm;
   implementing the expanded noise covariance matrix including at least one expanded noise-matrix diagonal element associated with the at least one fixed lever arm and associated with the at least one bent lever arm; and
   estimating the at least one lever arm in real-time based on the implementing of the expanded state transition matrix and the expanded noise covariance matrix.

3. The method of claim 2, wherein the at least one GPS antenna/receiver is a single GPS antenna/receiver, and wherein the at least one lever arm is a single lever arm,
   wherein implementing the expanded state transition matrix including the at least one expanded state-matrix diagonal element associated with the at least one fixed lever arm and associated with the at least one bent lever arm comprises:
   implementing the expanded state transition matrix including a single expanded state-matrix diagonal element associated with a single fixed lever arm and associated with a single bent lever arm.

4. The method of claim 3, wherein implementing the expanded noise covariance matrix including the at least one expanded noise-matrix diagonal element associated with the at least one fixed lever arm and associated with the at least one bent lever arm comprises:
   implementing the expanded noise transition matrix including a single expanded noise-matrix diagonal element associated with the single fixed lever arm and associated with the single bent lever arm, and wherein estimating the at least one lever arm in real-time based on the implementing of the expanded state transition matrix and the expanded noise covariance matrix comprises:

estimating the single lever arm in real-time based on the implementing of the expanded state transition matrix and the expanded noise covariance matrix.

5. The method of claim 3, further comprising:

positioning the inertial navigation system in a first position on a vehicle; and positioning the single GPS antenna/receiver in a second position on the vehicle, wherein the single lever arm is the difference between the first position and the second position.

6. The method of claim 2, wherein the at least one GPS antenna/receiver comprises a first GPS antenna/receiver and a second GPS antenna/receiver, wherein the at least one lever arm comprises a first lever arm and a second lever arm, and wherein implementing the expanded state transition matrix including the at least one expanded state-matrix diagonal element associated with the at least one fixed lever arm and associated with the at least one bent lever arm comprises:

implementing the expanded state transition matrix, wherein the expanded state transition matrix includes: a first-expanded state-matrix diagonal element associated with a first fixed lever arm and associated with a first bent lever arm; and a second-expanded state-matrix diagonal element associated with a second fixed lever arm and associated with a second bent lever arm.

7. The method of claim 6, wherein implementing the expanded noise covariance matrix including the at least one expanded noise-matrix diagonal element associated with the at least one fixed lever arm and associated with the at least one bent lever arm comprises:

implementing the expanded noise covariance matrix, wherein the expanded noise covariance matrix includes: a first-expanded noise-matrix diagonal element associated with the first fixed lever arm and associated with the first bent lever arm; and a second-expanded noise-matrix diagonal element associated with the second fixed lever arm and associated with the second bent lever arm.

8. The method of claim 7, wherein the estimating at least one lever arm in real-time based on the implementing of the expanded state transition matrix and the expanded noise covariance matrix comprises:

estimating a first lever arm; and estimating a second lever arm.

9. The method of claim 6, further comprising:

positioning the inertial navigation system in a first position on a vehicle;

positioning the first GPS antenna/receiver in a second position on the vehicle, wherein the first lever arm is the difference between the first position and the second position; and positioning the second GPS antenna/receiver in a third position on the vehicle, wherein the second lever arm is the difference between the first position and the third position.

10. A system with a respective global positioning system (GPS) self-calibrating lever arm function, the system comprising:

an inertial navigation system in a first position on a vehicle;

at least one global positioning system (GPS) antenna/receiver on the vehicle, wherein at least one lever arm is the at least one respective difference between the first position and an at least one position of the respective at least one GPS antenna/receiver; and a Kalman filter executable by a processor communicatively coupled to the inertial navigation system to: estimate at least one fixed lever arm component while accounting for a bending motion of the lever arm based on signals received at the inertial navigation system from the at least one GPS antenna/receiver by implementing an expanded state transition matrix and an expanded noise covariance matrix; and calibrate at least one lever arm based on the at least one fixed lever arm component estimate.

11. The system of claim 10, wherein the Kalman filter executable by the processor to estimate at least one fixed lever arm component while accounting for the bending motion of the lever arm is further configured to:

implement the expanded state transition matrix including at least one expanded state-matrix diagonal element associated with at least one fixed lever arm and associated with at least one bent lever arm;

implement the expanded noise covariance matrix including at least one expanded noise-matrix diagonal element associated with the at least one fixed lever arm and associated with the at least one bent lever arm; and estimate the at least one lever arm in real-time based on the implementing of the expanded state transition matrix and the expanded noise covariance matrix.

12. The system of claim 11, wherein the at least one GPS antenna/receiver is a single GPS antenna/receiver, and wherein the Kalman filter is further configured, when executed by the processor, to:

implement the expanded state transition matrix including a single expanded state-matrix diagonal element associated with a single fixed lever arm and associated with a single bent lever arm;

implement the expanded noise covariance matrix including a single expanded noise-matrix diagonal element associated with the single fixed lever arm and associated with the single bent lever arm; and estimate a single lever arm in real-time based on the implementing of the expanded state transition matrix and the expanded noise covariance matrix.

13. The system of claim 12, wherein the expanded state-matrix diagonal element associated with the single fixed lever arm and associated with the single bent lever arm comprises a 6-by-6 first-expanded state sub-matrix, and wherein the expanded noise-matrix diagonal element associated with the single fixed lever arm and associated with the single bent lever arm comprises a 6-by-6 first-expanded noise sub-matrix.

14. The system of claim 11, wherein the at least one lever arm includes a first lever arm and a second lever arm, and wherein the at least one GPS antenna/receiver further includes:

a first GPS antenna/receiver at a second position on the vehicle, wherein the first lever arm is the difference between the first position and the second position; and a second GPS antenna/receiver at a third position on the vehicle, wherein the second lever arm is the difference between the first position and the third position, and wherein the Kalman filter is further configured when executed by the processor to:

implement the expanded state transition matrix, wherein the expanded state transition matrix includes: a first expanded state-matrix diagonal element associated with a first fixed lever arm and associated with a first bent lever arm; and a second expanded state-matrix diagonal element associated with a second fixed lever arm and associated with a second bent lever arm;

implement the expanded noise covariance matrix, wherein the expanded noise covariance matrix includes: a first-expanded noise-matrix diagonal element associated with the first fixed lever arm and associated with the first bent lever arm; and a second-expanded noise-matrix diagonal element associated with the second fixed lever arm and associated with the second bent lever arm.

15. The system of claim 14, wherein, based on the implementing of the expanded state transition matrix and the expanded noise covariance matrix, the Kalman filter is further configured when executed by the processor to:
estimate a first lever arm in real-time; and
estimate a second lever arm in real-time.

16. The system of claim 14, wherein the first expanded state-matrix diagonal element associated with the first fixed lever arm and associated with the first bent lever arm comprises a 6-by-6 first-expanded state sub-matrix, and wherein the second expanded state-matrix diagonal element associated with the second fixed lever arm and associated with the second bent lever arm comprises a 6-by-6 first-expanded state sub-matrix.

17. The system of claim 14, wherein the first-expanded noise-matrix diagonal element associated with the first fixed lever arm and associated with the first bent lever arm comprises a 6-by-6 first-expanded noise sub-matrix, and wherein the second-expanded noise-matrix diagonal element associated with the second fixed lever arm and associated with the second bent lever arm comprises a 6-by-6 second-expanded noise sub-matrix.

18. The system of claim 10, further comprising:
at least one inertial navigation sensor communicatively coupled to the processor.

19. A program product for implementing an inertial navigation system to calibrate a lever arm, the program product comprising a non-transitory processor-readable medium on which program instructions are embodied, wherein the program instructions are operable, when executed by at least one processor in the inertial navigation system, to cause the inertial navigation system to:
estimate at least one fixed lever arm component while accounting for the bending motion of the lever arm in the Kalman filter based on signals received from at least one GPS antenna/receiver at the inertial navigation system by implementing an expanded state transition matrix and an expanded noise covariance matrix; and
calibrate the lever arm based on the at least one fixed lever arm component estimate.

20. The program product of claim 19, further comprising program instructions operable, when executed by at least one processor in an inertial navigation system including a single GPS antenna/receiver, to cause the inertial navigation system to:
implement the expanded state transition matrix including at least one expanded state-matrix diagonal element associated with at least one fixed lever arm and associated with at least one bent lever arm;
implement the expanded noise covariance matrix including at least one expanded noise-matrix diagonal element associated with the at least one fixed lever arm and associated with the at least one bent lever arm; and
estimate the lever arm in real-time based on the implementing of the expanded state transition matrix and the expanded noise covariance matrix.

\* \* \* \* \*